United States Patent
Geiler et al.

(10) Patent No.: US 9,943,968 B2
(45) Date of Patent: Apr. 17, 2018

(54) METHOD AND SYSTEM FOR STOPPING OF AXES OF AN INDUSTRIAL ROBOT

(71) Applicant: KUKA Roboter GmbH, Augsburg (DE)

(72) Inventors: Torsten Geiler, Augsburg (DE); Richard Rudolf, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 0 days.

(21) Appl. No.: 14/929,565

(22) Filed: Nov. 2, 2015

(65) Prior Publication Data

US 2016/0129598 A1 May 12, 2016

(30) Foreign Application Priority Data

Nov. 6, 2014 (DE) .......................... 10 2014 222 678

(51) Int. Cl.
| | |
|---|---|
| *G06F 19/00* | (2018.01) |
| *B25J 19/00* | (2006.01) |
| *B25J 9/16* | (2006.01) |
| *B25J 9/12* | (2006.01) |

(52) U.S. Cl.
CPC .......... *B25J 19/0004* (2013.01); *B25J 9/126* (2013.01); *B25J 9/161* (2013.01); *B25J 9/1633* (2013.01); *B25J 9/1674* (2013.01); *G05B 2219/41279* (2013.01); *G05B 2219/41284* (2013.01); *G05B 2219/42284* (2013.01); *Y10S 901/02* (2013.01)

(58) Field of Classification Search
CPC ........ B25J 19/0004; B25J 9/126; B25J 9/191; B25J 9/1633; B25J 9/1674; G05B 2219/41279; G05B 2219/41284; G05B 2219/42284; Y10S 901/02
USPC ................................................. 700/245, 261
See application file for complete search history.

(56) References Cited

U.S. PATENT DOCUMENTS

| | | | |
|---|---|---|---|
| 5,587,640 A | 12/1996 | Ek et al. | |
| 6,573,681 B2 | 6/2003 | Schwesig | |
| 7,852,030 B2 | 12/2010 | Kamiya | |
| 8,736,219 B2 | 5/2014 | Hofmann et al. | |
| 9,102,058 B2 | 8/2015 | Hofmann | |
| 9,415,515 B2 * | 8/2016 | Benali | B25J 9/1674 |

(Continued)

FOREIGN PATENT DOCUMENTS

| | | |
|---|---|---|
| DE | 10394302 | 5/2007 |
| DE | 202014002807 | 5/2014 |

(Continued)

OTHER PUBLICATIONS

The extended European Search Report, dated Jun. 17, 2016, in the related European Patent Appl. No. 15190549.4.

(Continued)

*Primary Examiner* — Ronnie Mancho (57) ABSTRACT

The invention relates to a method or a system for the dependable stopping of axes of an industrial robot. The industrial robot comprises a control device (501, 502), power electronics (201, 202, 203) and a DC source (300), as well as at least one axis (700), which is assigned to an electric motor (100) and to a mechanical brake (600). In order to stop the axis a direct current is supplied by the DC source in at least one motor phase of the motor, which generates a braking torque.

17 Claims, 4 Drawing Sheets

(56) References Cited

U.S. PATENT DOCUMENTS

| | | | | |
|---|---|---|---|---|
| 2013/0146574 A1* | 6/2013 | Birner-Such | ............ | B23K 9/28 |
| | | | | 219/136 |
| 2013/0218332 A1* | 8/2013 | Hofmann | ............... | B25J 9/1651 |
| | | | | 700/245 |
| 2016/0114480 A1* | 4/2016 | Krumbacher | ............ | B25J 9/046 |
| | | | | 74/490.03 |

FOREIGN PATENT DOCUMENTS

| | | |
|---|---|---|
| EP | 1857229 | 11/2007 |
| JP | 2012055981 A | 3/2012 |

OTHER PUBLICATIONS

Examination Report from GPTO in DE Appl. No. 10 2014 222 678.3, dated Jul. 21, 2015.
The English translation of the Korean Office Action, dated Mar. 28, 2017, in the related Korean Patent Appl. No. 10-2015-0155687.
The English translation of the Chinese Office Action, dated Jan. 26, 2017, in the related Chinese Patent Appl. No. 201510745278.6.

* cited by examiner

METHOD AND SYSTEM FOR STOPPING OF AXES OF AN INDUSTRIAL ROBOT

This application claims the benefit of priority under 35 § 119(a) to German Patent Application No. 10 2014 222 678.3, filed on Nov. 6, 2014.

1. FIELD OF THE INVENTION

The invention relates to a method and a system for controlling an industrial robot, and in particular for the dependable stopping of axes of an industrial robot.

2. BACKGROUND

Industrial robots are automatically guided manipulation machines, equipped with three or more freely-programmable axes, which are equipped with appropriate tools for the automatic manipulation of objects. They can be used in mobile or stationary applications. These robots are designed for use in industrial environments (e.g. automotive manufacturing) and generally comprise a manipulator (robot arm), a control device and drive means for moving the manipulator. In many cases, both the drive and the manipulator are monitored by means of sensors. The monitoring contributes to the control and regulation of the drive. The drive can, for example, be an electric drive, which comprises power electronics and an electric motor.

In certain situations, e.g. if a person enters a protected area surrounding the industrial robot, or if pre-determined limits for motor or axis parameters are exceeded, it is necessary to reliably and quickly stop the movement of the industrial robot and thus to dependably stop the axis/axes of the robot. The objective of the dependable stopping is to prevent movements which represent hazards, so as to not endanger machinery, workpieces and, in particular, people.

The standard EN 60204-1 differentiates between three categories of dependable stopping of robots:

category 0: Uncontrolled stopping of the axis through immediate (<200 ms) shutdown of the power supply to the drive.

category 1: Controlled stopping of the axis through interruption of the power supply to the drive, after the axis has been brought to a standstill (=time-delayed shutdown of the power supply).

category 2: Controlled stopping of the axis without interruption of the power supply to the drive.

In many applications, such as, for example, very quickly moved or gravity-loaded axes, a shutdown of the drive energy does not lead to the dependable stopping of the axis, since the axis can coast to a stop or sag as a result of gravity. Additional mechanical brakes are therefore used, conventionally disk brakes, which act, for example, directly on the motor shaft and which are maintained in the released state by means of a current-supplied electromagnet in failure-free operation of the robot. If the operating power is shut down—in the case of a category 0 stop, for instance—the brake is thus automatically applied. A common feature of all mechanical brakes is a certain activation delay. For current disk brakes, this is in a range, for example, of between 100 to 200 ms, before the brake pads come into contact with the brake disk once the braking signal has been sent.

Because the shutdown of the operating power almost immediately, i.e. within a few milliseconds of the command (i.e. after the signal to interrupt the power supply has been sent), leads to a shutdown of the motor, the drive coasts in an uncontrolled manner until the mechanical brake takes effect. Moreover, braking using the mechanical brake is disadvantageous, since high mechanical loads act on the components to be braked.

In order that these disadvantages can be avoided, a short-circuit braking of the motor, which is intended to reduce the coasting of the axis to a stop, is known from WO 2009/074 396 A1, for example. WO 2009/074 396 A1 corresponds to U.S. Pat. No. 8,736,219 B2 to Hofmann et al., which was published in the English language on May 27, 2014 and is hereby incorporated by reference in its entirety herein. To achieve a reduction in the coasting of the axis to a stop, the shut-down of the operating power short-circuits the motor phases of the electric motor, and a braking torque is thus generated. Because short-circuit braking relies, in a known manner, on the induction of current in the motor phases of the motor, the generated braking torque is, however, dependent on the rotational speed of the motor at the time of the shutdown of the operating power. In particular for axes moved slowly or for vertical gravity-loaded axes, the problem of sagging thus essentially remains unchanged.

The objective of the present invention is therefore to provide a method and a system for the dependable stopping of the axis/axes, which eliminates the aforementioned disadvantages and thus permits a quick stopping of the axis, in order to minimize or to avoid the coasting to a stop and the sagging of the axis in particular. This objective is achieved with the method for stopping of axes of an industrial robot according to Claim 1 and with the system for controlling an industrial robot according to Claim 6.

3. DETAILED DESCRIPTION OF THE INVENTION

The method according to the invention for stopping of axes and the system according to the invention for controlling an industrial robot serve, in particular, to brake the axes of the industrial robot, while avoiding a coasting to a stop and/or sagging of the axes, up until the axes come to a standstill, and to hold, i.e. lock, the axes in the stationary state until the axes are re-activated. Particularly preferably, the system according to the invention and the method according to the invention make it possible to avoid coasting to a stop and/or sagging, even when a stop of category 0 or 1 occurs, in other words, when the drive has no more available operating power.

The method or system according to the invention relates to industrial robots having at least one axis, an associated drive and a corresponding control device. The axis or the axes can be rotational or translational, with each axis preferably being assigned a link and a drive, so that the link can be moved by means of the drive either translationally or rotationally according to the axis.

The drive comprises at least one actuator, which, in the present invention, is in the form of an electric motor, and associated power electronics. Preferably, three-phase synchronous machines or asynchronous machines are used. To run the motor, the power electronics is actuated or regulated by the control device of the industrial robot.

The power electronics preferably has a three-phase inverter which drives the motor and an intermediate circuit upstream of the inverter, which is supplied by a rectifier. The inverter generates, e.g., by means of Pulse-Width Modulation (PWM), from a direct current voltage of the intermediate circuit, a three-phase alternating current voltage with adjustable frequency and amplitude according to the control signals of the control device.

The control device can comprise both the hardware required to control and or regulate the motor, and the necessary software. A control device based entirely on hardware is also conceivable according to the invention. The control device is configured to actuate the motor via the power electronics, using control signals, and to monitor the axes. The control device converts nominal values, such as rotation angle, rotational speed or acceleration of the motor, for example, into signals, which can be processed by the power electronics. The term "control signals" here also includes the case of a single control signal.

In addition to the actual control and regulation of the axes, the control device is preferably configured to send signals to stop the axes. For example, a signal to stop the axes is sent when the control device detects a control error. A control error can consist of the activation of a sensor, which, for example, monitors the safety of the industrial robot's environment. A signal to stop can additionally be generated by the manual activation of an emergency stop switch or the like. In addition, control errors can also be detected by the control device itself, in that permissible limits of the drive and/or of the manipulator are exceeded. Amongst other things, permissible maximum speeds, accelerations, motor currents and manipulator positions constitute possible limits.

The signals to stop the axis can bring about, amongst other things, the activation of a mechanical brake and an electrical braking of the motor. Preferably, every electric motor of the industrial robot is assigned a mechanical brake. At the least, however, the motors of gravity-loaded axes are equipped with a mechanical brake. The mechanical brake is preferably assigned to the motor shaft and designed as a disk brake. Other suitable brakes are, however, also possible. Holding brakes are tasked with braking the movement of moving masses or loads, or dependably keeping them at a standstill. As described at the outset, such mechanical brakes are subject to a certain activation delay, i.e. between the command (sending) of the signal to brake and the actual effect of the brake (generation of a braking torque) there is a time interval of usually between 100 to 200 ms, depending on the braking system used.

According to the invention, an electrical direct current braking is provided as electrical braking, which can, however, be combined with other electrical braking methods, such as short-circuit braking, for example. This is advantageous, in particular, in the case of very heavy robots, and can be useful, for instance, when the motor at the time of the braking command still has a sufficiently high rotational speed. The direct current braking according to the invention is used in this case only when the short-circuit braking has braked the motor to a certain rotational speed.

In order to activate the direct current braking, a DC source is provided, which is configured to generate a direct current. The DC source is connected to the motor in such a way that a direct current can be supplied in at least one motor phase of the motor. Preferably, the direct current is supplied in at least two motor phases. As a result of the supplied direct current, a static magnetic field is generated in the motor, which generates a braking torque and brakes the motor until it comes to a stop. The braking torque resulting from the direct current braking is independent of the motor rotational speed and preferably corresponds to the maximum torque (holding torque) of the motor. The direct current braking is thus suited not only to the actual braking of the axis to be stopped, but also to the holding of the axis in the desired position.

The DC source, according to a preferred embodiment of the invention, is an autonomous power source, separate from the power supply of the motor. The motor can thus, even after a stop of category 0 or 1 (i.e. after shutdown of the operating power), be supplied with direct current from the DC source, in order to generate a braking torque (or holding torque). The DC source is preferably an accumulator or a capacitor. Such a DC source along with a control device according to the invention can be provided separately for every axis to be stopped. Alternatively, the direct current braking of several motors (i.e. the braking of several axes) can be executed by a DC source and a control device.

4. DESCRIPTION OF PREFERRED EMBODIMENTS

Preferred embodiments of the invention are explained in greater detail below with reference to the accompanying figures, in which.

Figure 1:
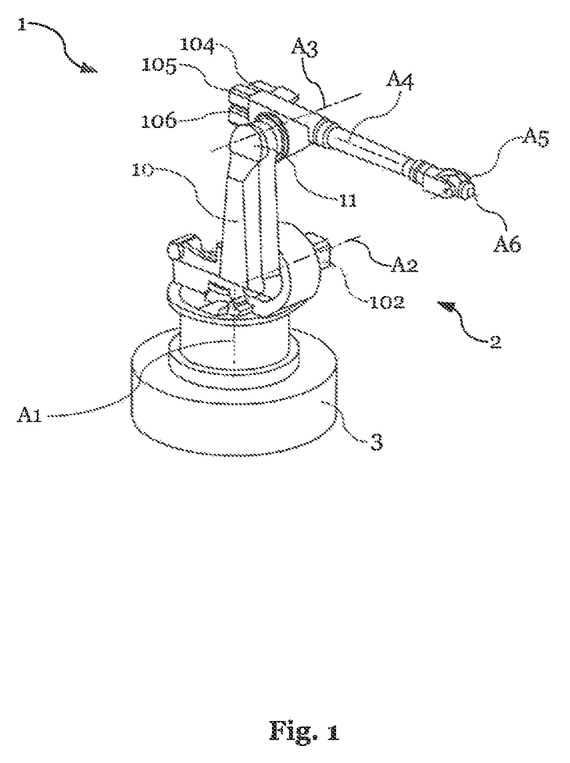
FIG. 1 shows an industrial robot, which has six axes A1-A6.

FIG. 1 depicts an industrial robot 1, which has a manipulator 2, which stands on a robot base 3, such that it can rotate about an axis A1, designed as a vertical axis. The manipulator 2 has a total of six rotational axes A1-A6, which are driven by electric motors 102, 104, 105, 106. Because of the perspective of the drawing, the electric motors of the axes A1 and A3 are not visible.

Figure 2:
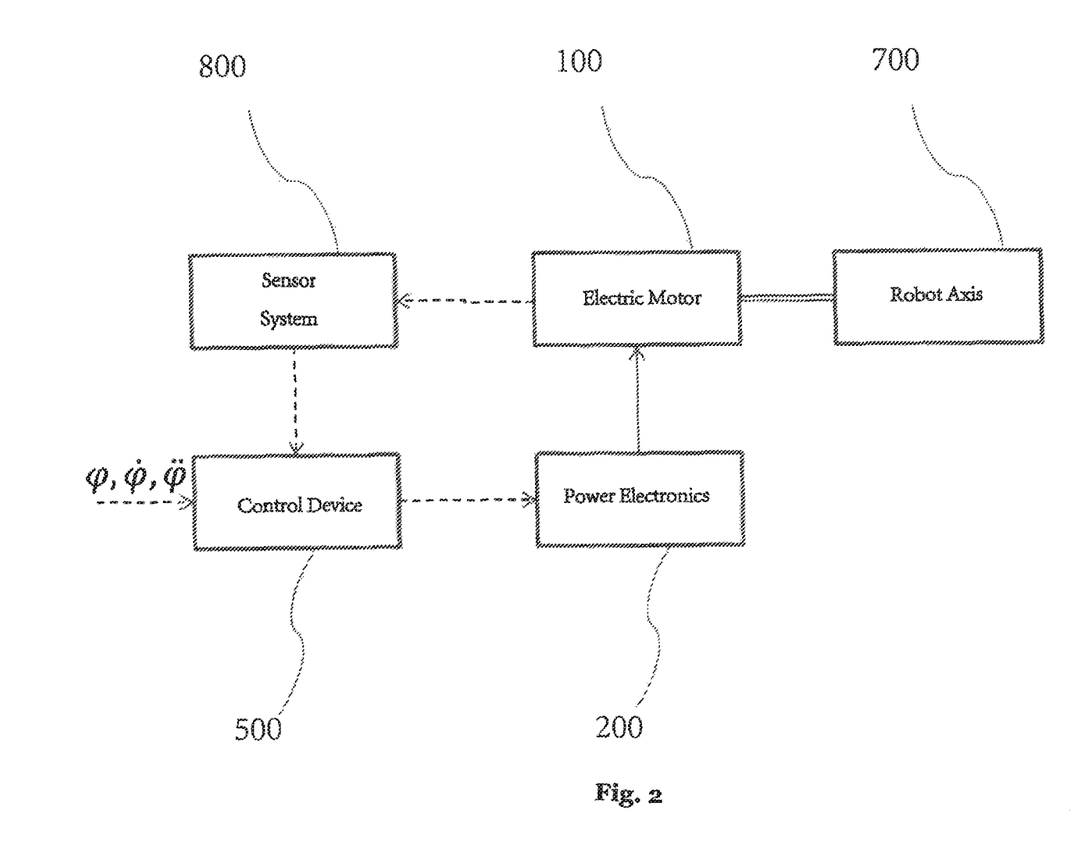
FIG. 2 shows a schematic signal and power flowchart of the system for controlling an industrial robot.

FIG. 2 shows a schematic signal and power flowchart of the system for controlling an industrial robot. In FIG. 2, signal paths are represented by dashed lines and energy paths by a solid line when these are electrical energy paths, and by a double line when these are kinetic energy paths.

A signal for executing a target movement of an axis 700 is delivered to the control device 500, for example, by a control program in the form of a motor angle $\varphi$, a motor rotational speed $\dot\varphi$; and/or a motor acceleration $\ddot\varphi$;□. This control device converts the signal for the power electronics 200. The power electronics generates, according to the signal, a three-phase alternating current voltage with variable frequency and amplitude or an alternating current for actuation of the motor 100, which drives an axis 700 via the motor shaft. The movements of the motor $\varphi$, $\dot\varphi$;, $\ddot\varphi$;□ are monitored by a sensor system 800, and thus the actual values of the movement are determined. The control circuit is closed by the feedback of the actual values.

Figure 3:
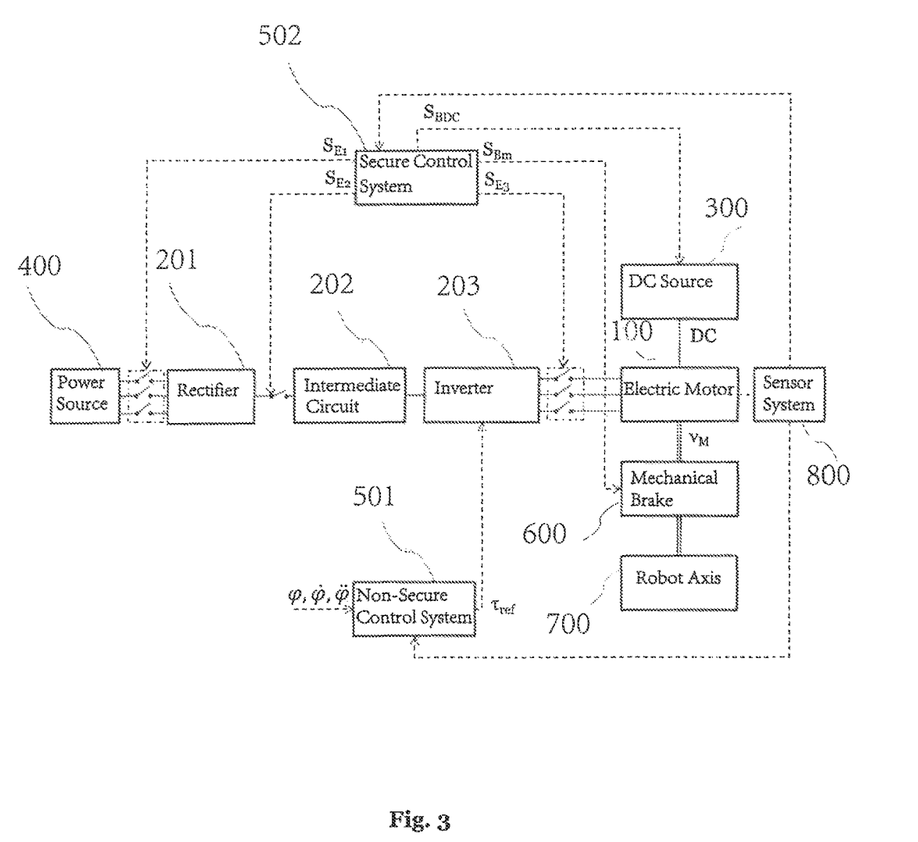
FIG. 3 shows a signal and power flowchart of the system for controlling an industrial robot according to a first embodiment of the invention.

FIG. 3 shows a signal and power flowchart of the system for controlling an industrial robot according to a first embodiment of the invention. The system comprises an industrial robot which has at least one axis 700, an electric motor 100 with associated power electronics and a control device. The axis 700 is assigned the motor 100, which is actuated by the power electronics. The motor 100 is equipped with a mechanical brake 600. The power electronics comprise a rectifier 201, an intermediate circuit 202 and an inverter 203, and are supplied with power by a main power source 400. A DC source 300 is connected to the motor 100 such that direct current can be supplied in at least one of the motor phases, in order to generate a braking torque. The motor is monitored by means of the sensor system 800, which sends relevant motor parameters, such as the rotational speed, torque and the like, to the control device.

The control device is, in the embodiment of the invention depicted, in two parts and comprises a non-secure control system ("first control system") 501 and a secure control system ("second control system") 502. Both the first control system 501 and the second control system 502 comprise both software and hardware components and can be redundant systems.

The first control system 501 is configured to actuate the motor via the power electronics using control signals $\tau_{ref}$ and to monitor the sensor system 800 of the axis/axes, so that a regulation of the axes in the closed control circuit is possible. The second control system 502 monitors, amongst other things, the sensor system 800 and compares the measured values with permissible limits in order to detect control errors. If the second control system 502 detects, e.g., a control error, a signal to stop the axis is sent.

In the case of a stop of category 0 ("emergency stop") or of category 1, the second control system sends a signal to stop the axis $S_{Bm}$ to the mechanical brake and preferably simultaneously sends a signal to stop the axis $S_{BDC}$ to the DC source. In addition, a signal to disconnect the operating power is sent, preferably by the secure control system. The disconnection preferably occurs by addressing appropriate switches, which are designed, for example, as power transistors such as bipolar transistors or IGBTs. In the embodiment of FIG. 3, the disconnection of the operating power from the motor can, by way of example, be realized using three different methods; namely by disconnecting all of the power electronics from the main power source 400 (signal $S_{E1}$), or by disconnecting the intermediate circuit 201 from the rectifier 202 (signal $S_{E2}$) or by a disconnection of the power electronics from the motor (signal $S_{E3}$). In practice, one of the three methods will suffice, and preferably that method is the disconnection of the power electronics from the motor (signal $S_{E3}$). The different switch assemblies can, however, also be combined.

In response to the signal to stop the axis $S_{BDC}$, a direct current is supplied in at least one motor phase of the motor, in order to generate a braking torque. In one embodiment of the invention, the regulated DC source 300 is part of the power electronics and is configured to be supplied by the rectifier 201, but preferably by an intermediate circuit 202 of the power electronics. In a particularly preferred embodiment of the invention, the DC source 300 is supplied by an intermediate circuit capacitor, or it is the intermediate capacitor, so that the system can carry out, even after disconnection of the power electronics from the main power source 400 (signal $S_{E1}$), a direct current braking.

Alternatively, the DC source 300 can also be a completely redundant DC source, and is preferably a regulated DC source. The regulated DC source is preferably configured to generate a regulated direct current, which direct current does not exceed a pre-determined maximum value, so as to avoid damage to the motor. Furthermore, the regulated DC source can be configured such that the direct current is kept constant over the period of time in which the direct current is supplied in the motor phase.

In a preferred embodiment of the invention it is provided that, in addition to the DC braking according to the invention, a short-circuit braking is realized. The short-circuit braking of the motor precedes the direct current braking (i.e. the sending of the signal to stop the axis to the DC source $S_{BDC}$). For this purpose, the control device sends a signal to activate a short-circuit braking, which short-circuits the motor phases. The short circuit generates a braking torque dependent on the motor rotational speed. The motor phases can be short-circuited, for example, by means of a braking resistor. In this regard, reference is made, by way of example, to the document WO 2009/074 396 A1 mentioned at the outset. The short-circuit braking can be activated by the secure control system and by the first control system. In particular at high motor rotational speeds, the short-circuit braking generates a high braking torque. At low motor rotational speeds the achievable braking torque drops significantly, so that the direct current braking is then used.

In another embodiment of the invention, the sending to the DC source $S_{BDC}$ of the signal to stop the axis is dependent on motor parameters, such as motor current or motor rotational speed or axis speed. Preferably, the signal destined for the DC source $S_{BDC}$ to stop the axis is only activated when the motor rotational speed has fallen below a value of 1000 rpm, preferably 100 rpm, and particularly preferably 10 rpm. As already mentioned, in the case of short-circuit braking, the braking torque decreases with the falling motor rotational speed. If the braking torque falls below a limit, then there is a changeover to the direct current braking according to the invention, which functions in a manner independent of the rotational speed.

The present invention permits a very quick stopping of the motor and preferably stops the motor completely before the mechanical brake takes effect. In other words, the motor is electrically braked to a standstill, preferably during the activation delay of the mechanical brake, so that the mechanical brake serves purely as a holding brake. In this way, the mechanical loads to the axis are advantageously minimized.

Figure 4:
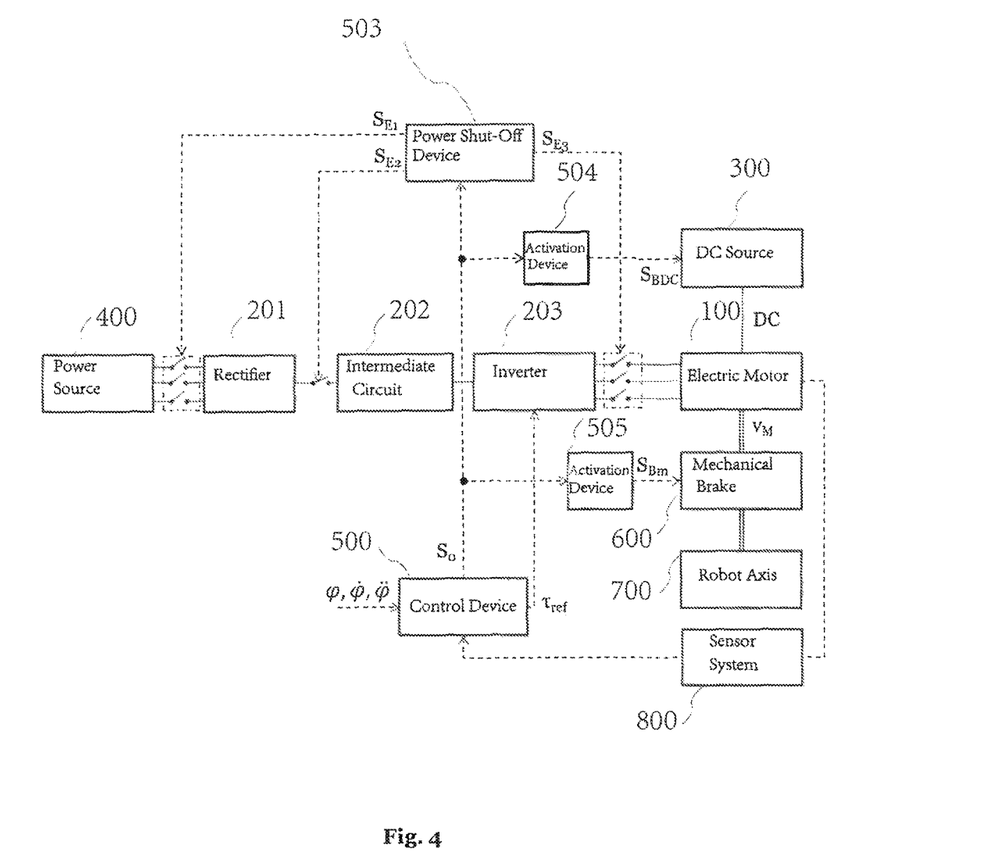
FIG. 4 shows a signal and power flowchart of the system for controlling an industrial robot according to a second embodiment of the invention.

FIG. 4 shows a signal and energy flowchart according to a second embodiment of the invention. By contrast with the system shown in FIG. 3, the control device 500, which can comprise both a secure and a first control system, sends the signal to stop the axis $S_0$. Additional control devices 503, 504, 505 receive the signal S.sub.0 and convert the signal to stop the axis into signals to disconnect the operating power $S_{E1}$, $S_{E2}$, $S_{E3}$ (in practice, the disconnection will usually only occur at one location), into signals to activate the direct current braking $S_{BDC}$ and into signals to activate the mechanical braking $S_{Bm}$. The power shut-off device 503 generates the signals $S_{E1}$, $S_{E2}$, and/or $S_{E3}$ and sends these to the corresponding switch in order to disconnect the operating power from the motor. The DC brake activation device 504 generates the signal to activate the direct current braking $S_{BDC}$ and sends this to the DC source 300, in order to activate the direct current braking. The mechanical brake activation device 505 generates a signal to activate the mechanical braking $S_{Bm}$ and sends this to the mechanical brake 600. The control devices 503, 504, 505 can convert the signal $S_0$ with a time delay, in order to thus achieve a desired chronological signal sequence. Not depicted is a device for activating a short-circuit braking. This can, however, be implemented in a similar manner to that already described.

It should be noted that the invention claimed herein is not limited to the described embodiments, but may be otherwise variously embodied within the scope of the claims listed infra.

5. REFERENCE NUMERAL LIST

1: Industrial robot
2: Manipulator
3: Robot base
10: Link

11: Joint
100: Electric motor
102: Motor assigned to the axis A2
104: Motor assigned to the axis A4
105: Motor assigned to the axis A5
106: Motor assigned to the axis A6
200 Power electronics
201: Rectifier
202: Intermediate circuit
203: Inverter
300: DC source
400: Main power source
500 Control device
501: First control system
502: Second control system
503: Power shut-off device (second control system)
504: DC brake activation device (second control system)
505: Mechanical brake activation device (second control system)
600: Mechanical brake
700: Axis
800: Sensor system
A1-A6: Axes of the industrial robot
$S_{E1}$, $S_{E2}$, $S_{E3}$: Signal to disconnect the operating power
$S_{BDC}$: Signal to activate a direct current braking
$S_{Bm}$: Signal to activate a mechanical braking
$_0$: Signal to stop the axis
$v_M$: Speed of the motor (actual value)
$\tau_{ref}$: Control signal
$\varphi, \dot\varphi;, \ddot\varphi; \Box$: Motor angle, motor rotational speed, motor acceleration (nominal values)

The invention claimed is:

1. A method for stopping movement of axes of an industrial robot, wherein the industrial robot comprises at least one control device, power electronics, a DC source and at least one axis which is assigned to an electric motor that is equipped with a mechanical brake, and wherein the control device is configured to actuate the electric motor via the power electronics using control signals ($\ddot y_{ref}$), the method including the steps of:
   a) sending a signal from the control device to the mechanical brake to stop movement of the robot in the at least one axis;
   b) sending a signal to activate a short-circuit braking of the motor assigned to the at least one axis, whereby the motor phases are short-circuited to generate a braking torque that depends on a rotational speed of the electric motor at the time when the motor phases are short circuited;
   c) after activating the short-circuit braking of the motor, sending a signal to the DC source to activate a direct current braking of the motor before the mechanical brake takes effect; and
   d) in response to the signal of step c), supplying a direct current from the DC source in at least one motor phase of the motor assigned to the at least one axis to generate a braking torque that is independent of the rotational speed of the motor.

2. The method according to claim 1, wherein the power electronics comprise a rectifier, an intermediate circuit and an inverter and are supplied with operating power by a main power source, wherein the signals in steps a) through c) activate a stop such that the motor is disconnected from the operating power.

3. The method according to claim 2, wherein the disconnection of the operating power disconnects the power electronics from the main power source, disconnects the intermediate circuit from the rectifier and disconnects the power electronics from the motor.

4. The method according to claim 1, wherein step c) of the method is activated as a function of motor parameters, and wherein step c) occurs only when the motor rotational speed has fallen below a value of 1000 rpm.

5. A system for controlling an industrial robot, in particular for stopping movement of axes of the industrial robot, wherein the industrial robot has:
   at least one axis which is assigned to an electric motor that is equipped with a mechanical brake;
   a control device; and
   power electronics, wherein:
   the control device is configured to actuate the motor via the power electronics using control signals and to send signals to stop movement of the at least one axis,
   the signals to stop movement of the at least one axis bring about the activation of the mechanical brake and an electrical braking of the motor assigned to the at least one axis,
   the system additionally comprises a DC source for the electrical braking, the DC source being connected to the motor so as to supply direct current in at least one motor phase of the motor assigned to the at least one axis in order to generate a braking torque that is independent of the rotational speed of the motor, and
   the control device is configured to bring about the electrical braking of the motor before the intervention of the mechanical brake.

6. The system according to claim 5, wherein the DC source is autonomous from the power electronics.

7. The system according to claim 5, wherein the DC source is configured as an intermediate circuit of the power electronics comprising a capacitor for supplying the direct current to the at least one motor phase independent of operating power supplied to the power electronics by a main power source, and to the electric motor by the power electronics.

8. The system according to claim 5, wherein the DC source is a regulated DC source, and wherein the regulated DC source is configured to generate a regulated direct current that does not exceed a pre-determined maximum value and is kept constant over the period of time in which the direct current is supplied in the at least one motor phase.

9. The system according to claim 5, wherein:
   the control device comprises at least a first control system and a second control system, and wherein the first control system actuates the electric motor via the power electronics using the control signals, which power electronics receive operating power from a main power source and generate, dependent on the control signals, an alternating current voltage with variable frequency and amplitude for the supply and control of the at least one motor, and
   the second control system sends the signals to stop movement of the at least one axis when pre-determined limits are exceeded, causing the operating power to be disconnected from the power electronics.

10. The method according to claim 4, wherein step c) occurs only when the motor rotational speed has fallen below 100 rpm.

11. The method according to claim 4, wherein step c) occurs only when the motor rotational speed has fallen below 10 rpm.

12. The method according to claim 1, wherein the DC source is autonomous from the power electronics.

13. The method according to claim 1, wherein the DC source is configured as an intermediate circuit of the power electronics comprising a capacitor for supplying the direct current to the at least one motor phase independent of operating power supplied to the electric motor by the power electronics.

14. The method according to claim 1, wherein the DC source is a regulated DC source, and wherein the regulated DC source is configured to generate a regulated direct current that does not exceed a pre-determined maximum value and is kept constant over the period of time in which the direct current is supplied in the at least one motor phase.

15. The method according to claim 1, wherein:
the control device comprises at least a first control system and a second control system, and wherein the first control system actuates the electric motor via the power electronics using the control signals, which power electronics receive operating power from a main power source and generate, dependent on the control signals, an alternating current voltage with variable frequency and amplitude for the supply and control of the at least one motor, and
the second control system sends the signals to stop movement of the at least one axis when pre-determined limits are exceeded, causing operating power to be disconnected from the power electronics.

16. The method according to claim 1, wherein the braking torque that is independent of the rotational speed of the motor corresponds to a holding torque of the motor.

17. The system according to claim 5, wherein the braking torque corresponds to a holding torque of the motor.

* * * * *